US008349226B2

(12) United States Patent  
Borneis et al.

(10) Patent No.: US 8,349,226 B2  
(45) Date of Patent: Jan. 8, 2013

(54) METHOD OF INCREASING THE LASER DAMAGE THRESHOLD OF DIFFRACTION GRATINGS

(75) Inventors: Stefan Borneis, Fulda (DE); Eckehard Onkels, Einhausen (DE); Dasa Javorkova, Münster (DE); Paul Neumayer, Darmstadt (DE)

(73) Assignee: GSI Helmholtzzentrum fur Schwerionenforschung GmbH, Darmstadt (DE)

( * ) Notice: Subject to any disclaimer, the term of this patent is extended or adjusted under 35 U.S.C. 154(b) by 697 days.

(21) Appl. No.: 11/883,435

(22) PCT Filed: Feb. 16, 2006

(86) PCT No.: PCT/EP2006/001410

§ 371 (c)(1),  
(2), (4) Date: Aug. 20, 2008

(87) PCT Pub. No.: WO2006/089681

PCT Pub. Date: Aug. 31, 2006

(65) Prior Publication Data

US 2009/0028206 A1    Jan. 29, 2009

(30) Foreign Application Priority Data

Feb. 22, 2005 (EP) .................................. 05003757

(51) Int. Cl.  
*B29D 11/00* (2006.01)
(52) U.S. Cl. .................. 264/1.31; 264/1.37; 264/482
(58) Field of Classification Search ................ 264/1.34, 264/1.37, 482, 1.31  
See application file for complete search history.

(56) References Cited

U.S. PATENT DOCUMENTS

| 5,472,748 A | 12/1995 | Wolfe et al. |
| 5,907,436 A * | 5/1999 | Perry et al. .................. 359/576 |
| 2001/0009251 A1 | 7/2001 | Sckizawa et al. |
| 2002/0046579 A1 | 4/2002 | Peterson et al. |
| 2005/0231806 A1 * | 10/2005 | Barton et al. .................. 359/566 |

OTHER PUBLICATIONS

English Translation of International Preliminary Report on Patentability 7pgs.
"Multilayer dielectric gratings for petawatt-class laser systems" Britten et al. Laser-Induced Damage in Optical Materials: 2003, Proceedings of SPIE vol. 5273.
"What is laser conditioning? A review focused on dielectric multilayers" Part of the Symposium on Laser-Induced Damage in Optical Materials; 1998 Boulder, CO Sep.-Oct. 1998.
"Large area laser conditioning of dielectric thin film mirrors" Database Compendex [online] Engineering Information, Inc., New York, NY, US Kozlowski et al.
"Laser conditioning of optical thin films" Database Compendex [online] Engineering Information, Inc., New York, NY, US Wolfe et al.
"Precision short-pulse damage test station utilizing optical parametric chirped-pulse amplification" Review of Scientific Instruments Nov. 2004 (Nov. 10, 2004) Seiten.

* cited by examiner

*Primary Examiner* — Mathieu D. Vargot  
(74) *Attorney, Agent, or Firm* — Reising Ethington PC

(57) ABSTRACT

For increasing the laser damage threshold (LDT) of diffraction gratings, particularly of multi-layer dielectric diffraction (MLD) gratings, the invention proposes a method for treating a diffraction grating to be used in a high energy laser apparatus having a first laser with the steps of providing the diffraction grating, providing a second treatment laser and irradiating the diffraction grating with laser light from the second treatment laser until the laser damage threshold of the diffraction grating has increased.

Figure 1:
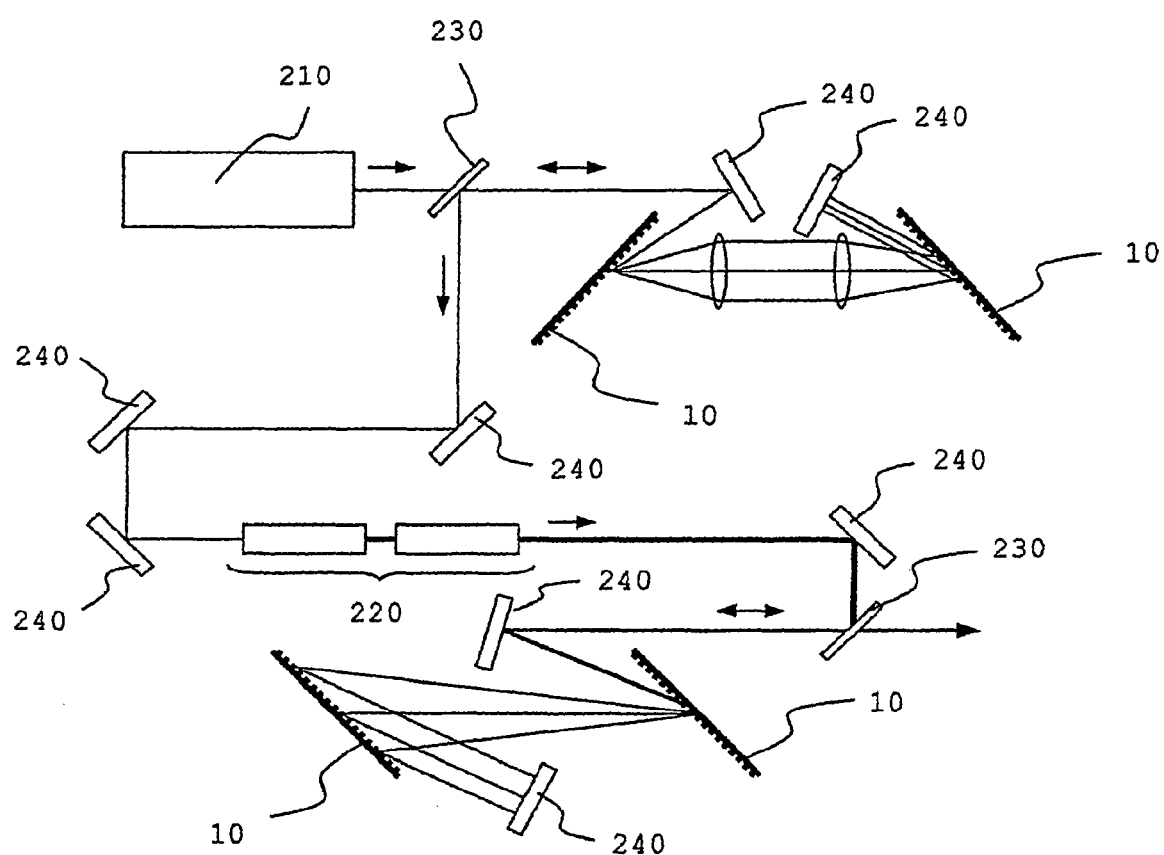

Furthermore, the invention proposes a diffraction grating treated according to the method, as well as a laser system, which comprises such a diffraction grating.

18 Claims, 3 Drawing Sheets

METHOD OF INCREASING THE LASER DAMAGE THRESHOLD OF DIFFRACTION GRATINGS

The invention relates to a method for increasing the laser damage threshold (LDT) of optical components, particularly of multi-layer dielectric (MLD) diffraction gratings, as to accordingly improved optical components.

To research nuclear fusion as well as fundamental processes, e.g. in plasma, astro and atomic physics, high energy lasers in the tera and gigawatt range are today used to generate ultra-intensive laser pulses. The achievable power output of ultra-intensive laser pulses is particularly limited by the properties of the used optical components and especially by their laser damage threshold.

The impact on optical components caused by the generation of ultra-intensive pulses can be reduced by a method known as CPA method (Chirped Pulse Amplification; CPA). When using the CPA method, an optical pulse of large spectral band width is firstly lengthened in time, amplified and again compressed after amplification. Thereby, the intensity of a high energy laser can be reduced during amplification typically by several orders of magnitude. But the risk of destroying optical components at the exit of the optical compressor cannot be eliminated by the CPA method. Especially, the diffraction gratings used in the compressor belong to those critical optical components.

Diffraction gratings with the highest laser damage thresholds are today produced by holographical reproduction on photoresist and successive etching of the top layer of a multi-layer dielectric (MLD) to get a highly efficient reflection grating.

This is described for example in Optics Letters, 20, p. 1349 ff., 1995 (L. Li and J. Hirsh, "All-dielectric, high-efficiency reflection gratings made with multi-layer thin-film coatings"), J. Opt. Soc. Am. A 14, 1124 (1997) (B. W. Shore, M. D. Perry, J. A. Britten, R. D. Boyd, M. D. Feit, H. T. Nguyen, R. Chow, G. E. Loomis and L. Li "Design of High-Efficiency Dielectric Reflection Gratings"), Applied Optics, Oct. 20, 1999 (K. Hehl, et. al., "High-efficiency dielectric reflection gratings: design, fabrication and analysis"), Proc. SPIE V5273, 1, (2004) (J. A. Britten, W. A. Molander, A. M. Komashko and C. P. J. Barty) and Nucl. Fusion 44 S266 (2004) (C. P. J. Barty, M. Key, J. Britten, R. Beach, G. Beer, C. Brown, S. Bryan, J. Caird, T. Carlson, J. Crane, J. Dawson, A. C. Erlandson, D. Fittinghoff, M. Hermann, C. Hoaglan, A. Iyer, L. Jones II, I. Jovanovic, A. Komashko, O. Landen, Z. Liao, W. Molander, S. Mitchell, E. Moses, N. Nielsen, H.-H. Nguyen, J. Nissen, S. Payne, D. Pennington, L. Risinger, M. Rushford, K. Skulina, M. Spaeth, B. Stuart, G. Tietbohl and B. Watellier).

The disclosure content of the cited articles is incorporated by reference into the disclosure content of this patent application.

The diffraction gratings described in the cited articles can achieve a laser damage threshold for pulse durations of 10 ps, which is nearly ten times higher than the thresholds of conventional gold gratings. With pulse durations of 500 fs an improvement of factor 2 is achieved in comparison to gold gratings with a maximal laser damage threshold of 0.6 J/cm$^2$. All over the world, endeavours are made to further improve the laser damage threshold of MLD gratings, because this threshold is considered to be one of the greatest technological challenges and to be one of the critical components in the design of high energy petawatt (HEPW) laser systems, e.g. like the NIF (National Ignition Facility) being under construction at the Lawrence Livermoore National Laboratory.

To avoid destroying the compression gratings in a CPA-system, the beam is typically broadened prior to compression. But by broadening the beam the necessary dimensions of the used optical components increase disadvantageously. With the dimensions, however, also the costs increase substantially. Furthermore, optical components cannot be produced in just any size from mechanical stability considerations alone.

From U.S. Pat. No. 6,620,333 a method is known, by which spreading of surface areas destroyed by laser irradiation can be avoided by local material removal, e.g. by plasma treatment. In U.S. Pat. No. 6,518,539 B2 a method for treating optical components made from fused quartz is described, wherein by means of laser irradiation points of destruction are generated, the spreading of which is limited by a further laser irradiation.

U.S. Pat. No. 6,705,125 B2 describes a method for treating fused quartz optical systems to be used at wavelengths of 360 nm and below, wherein the optical systems are treated by laser irradiation with increasing fluency to reduce the destruction of the optical systems during the later usage. Furthermore, from U.S. Pat. No. 5,472,748 a method for increasing the laser damage threshold of thin optical layers by laser treatment is known, wherein the laser irradiation is carried out at the same wavelength, for which the laser damage threshold shall be reduced.

The disclosure content of the patent documents U.S. Pat. No. 5,472,748, U.S. Pat. No. 6,518,539, U.S. Pat. No. 6,620,333 and U.S. Pat. No. 6,705,125 is incorporated by reference into the disclosure content of this patent application.

None of the cited patent documents relates to the treatment of diffraction gratings for increasing the laser damage threshold.

Therefore, the object of the invention is to show a way, how the quality and in particular the laser damage threshold of diffraction gratings, in particular of MLD gratings, can be improved.

This object is achieved by a method according to claim 1, a diffraction grating according to claim 21, as well as by a laser system according to claim 25. Advantageous embodiments and refinements are described in the respective dependent claims.

Accordingly, an inventive method for treating a diffraction grating to be used in a high energy laser apparatus having a first laser comprises providing the diffraction grating, providing a second treatment laser and irradiating the diffraction grating with laser light from the second treatment laser until the laser damage threshold of the diffraction grating is increased.

The inventors have discovered that the laser damage threshold of a diffraction grating, especially of a MLD diffraction grating is increased, if the grating is irradiated by an intensive laser beam of a treatment laser close to and below the laser damage threshold or, for a ramp-like increase of the output power of the treatment laser, even beyond the laser damage threshold of the treatment laser.

Accordingly, irradiating the diffraction grating advantageously comprises increasing the output power of the second treatment laser in a ramp-like fashion beyond the laser damage threshold of the second treatment laser. With special advantage, the output power of the second treatment laser is increased in a ramp-like fashion from below 80% up to at least 120% of the laser damage threshold. The method according to the invention is particularly advantageous for increasing the laser damage threshold for femto- and pico-seconds laser pulses of MLD diffraction gratings, like those used in terawatt (TW) and petawatt (PW) pulse compressors.

A laser irradiation with the second treatment laser with repetition rates between 1 and 1000 Hz and with a duration of at least 10 seconds has been proven to be particularly preferable.

With special advantage, the diffraction grating is adapted to be used in a terawatt or petawatt high energy laser apparatus. Preferably, the high energy laser apparatus, in which the diffraction grating is used, is suitable for generating laser light in the visible or in the infrared frequency range. In particular, the diffraction grating preferably is adapted to be used in a high energy laser apparatus with a laser wavelength of 1054 nm+/−30%. Furthermore, the high energy laser apparatus preferably is adapted for generating ultra-short laser pulses, especially with a pulse duration below 20 ps.

In an advantageous embodiment of the invention, the preferred wave length of the second treatment laser, which differs from the high energy laser apparatus typically provided as a terawatt or petawatt laser, lies within the UV range, preferably at 355 nm, 308 nm, 248 nm, 193 nm or 157 nm. Furthermore, suitable wavelengths of the second treatment laser comprise wavelengths of 1064 nm, 557 nm and 532 nm, as well as other wavelengths below 550 nm. An example of a suitable treatment laser is an excimer laser, but other types of lasers also lie within the scope of the invention.

Furthermore, in a preferred embodiment of the invention a material with a low absorption at the wavelength of the treatment laser, is chosen as material for the multi-layer stack and for the substrate of the MLD diffraction grating, e.g. fused quartz as substrate material in case of using a treatment laser in the UV-range. Using material with a low absorption allows a maximal strike fluency of the treatment laser without already causing a destruction by the laser treatment, whereby the efficiency of the inventive method is increased.

In particular, it is known that UV light is suited to change the material properties of various materials. In this respect it has to be assumed that not only the surface quality of the diffraction grating is improved by UV irradiation, but also the layer system of the MLD stack and the underlying material.

Preferably, the laser treatment by the second treatment laser is carried out with a fluency which is below 90% of the UV damage fluency of the diffraction grating.

With particular advantage, the second treatment laser has a different wavelength as the laser irradiation generated by the high energy laser apparatus. Within the high energy laser apparatus a diffraction grating can also be irradiated with a laser radiation of a different wavelength as the output wavelength of the high energy laser apparatus, for example if frequency multipliers are provided in the high energy laser apparatus. Accordingly, the second treatment laser further preferably has a different wavelength as the laser radiation, by which the diffraction grating is irradiated during operation.

Since the inventive method is sensitive to impurities from the environment, irradiating advantageously takes place in vacuum.

Preferably, the diffraction grating is a multi-layer dielectric (MLD) diffraction grating. For such a diffraction grating particularly preferred embodiment of the inventive method provides for a reflector of the diffraction grating to be irradiated in a first step before the diffraction grating is etched, and etching the grid of the diffraction grating in a second step. Advantageously, in a third step, after etching the grid of the diffraction grating, it can be additionally be provided for irradiating again with the second treatment laser can be provided additionally.

In a further advantageous embodiment the diffraction grating is arranged in the optical path of a laser system, which comprises the high energy laser apparatus, wherein the high energy laser apparatus is arranged in a position such that the laser pulses generated by it can be directed onto the diffraction grating to be reflected by the diffraction grating in another direction for further usage.

The invention comprises further a diffraction grating, which was treated by the described method. Preferably, a diffraction grating according to the invention provides a laser damage threshold of at least 0.7 J/cm² for a laser pulse of 500 fs. Furthermore, a diffraction grating according to the invention with special advantage is provided as an etched MLD diffraction grating. Preferably, the grid of the diffraction grating has 1740 lines/mm+/−50%.

A laser system according to the invention comprises a high energy laser apparatus, a beam guiding to direct laser light from the high energy laser apparatus to a target apparatus, and at least one diffraction grating as described above, wherein laser light is guided from the high energy laser apparatus to the diffraction grating and reflected by the diffraction grating such that it is guided to the target apparatus.

In the following, the invention is described in more detail by means of preferred embodiments and referring to the attached drawings. Thereby, same reference signs in the drawings indicate same or similar parts.

Figure 2:
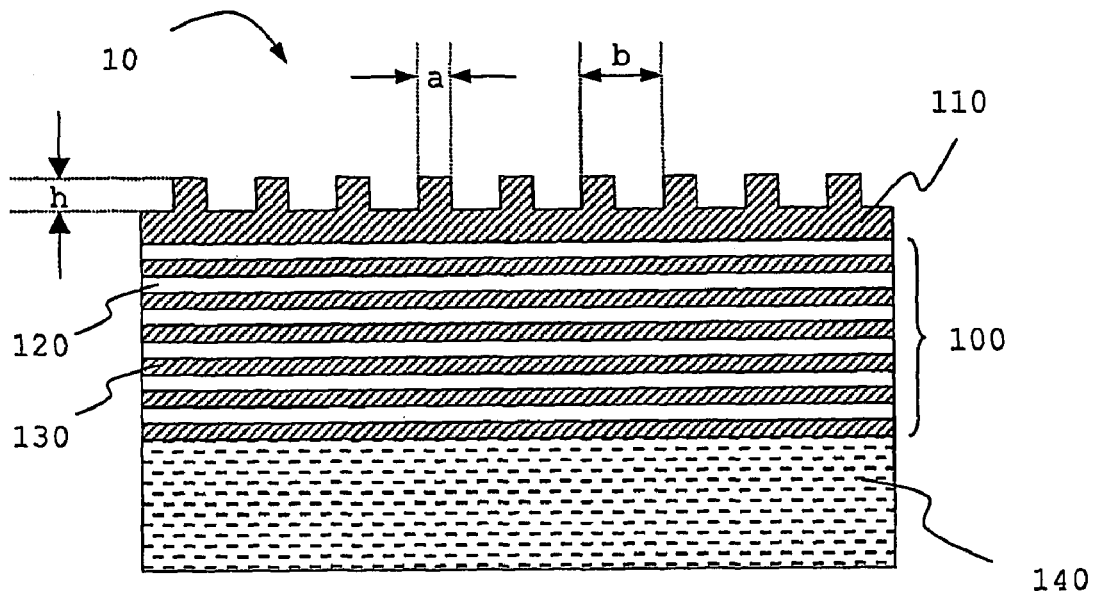
Figure 3A:
Figure 3B:
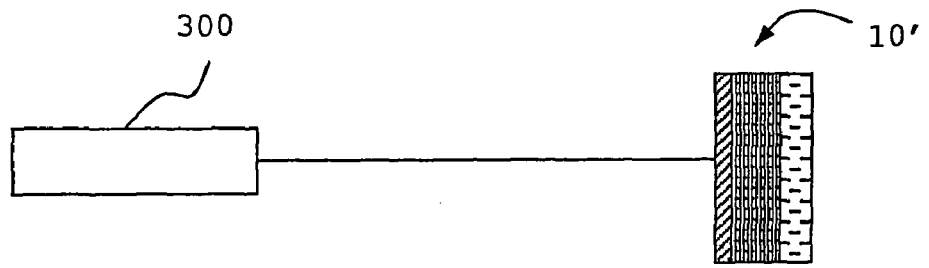
Figure 4:
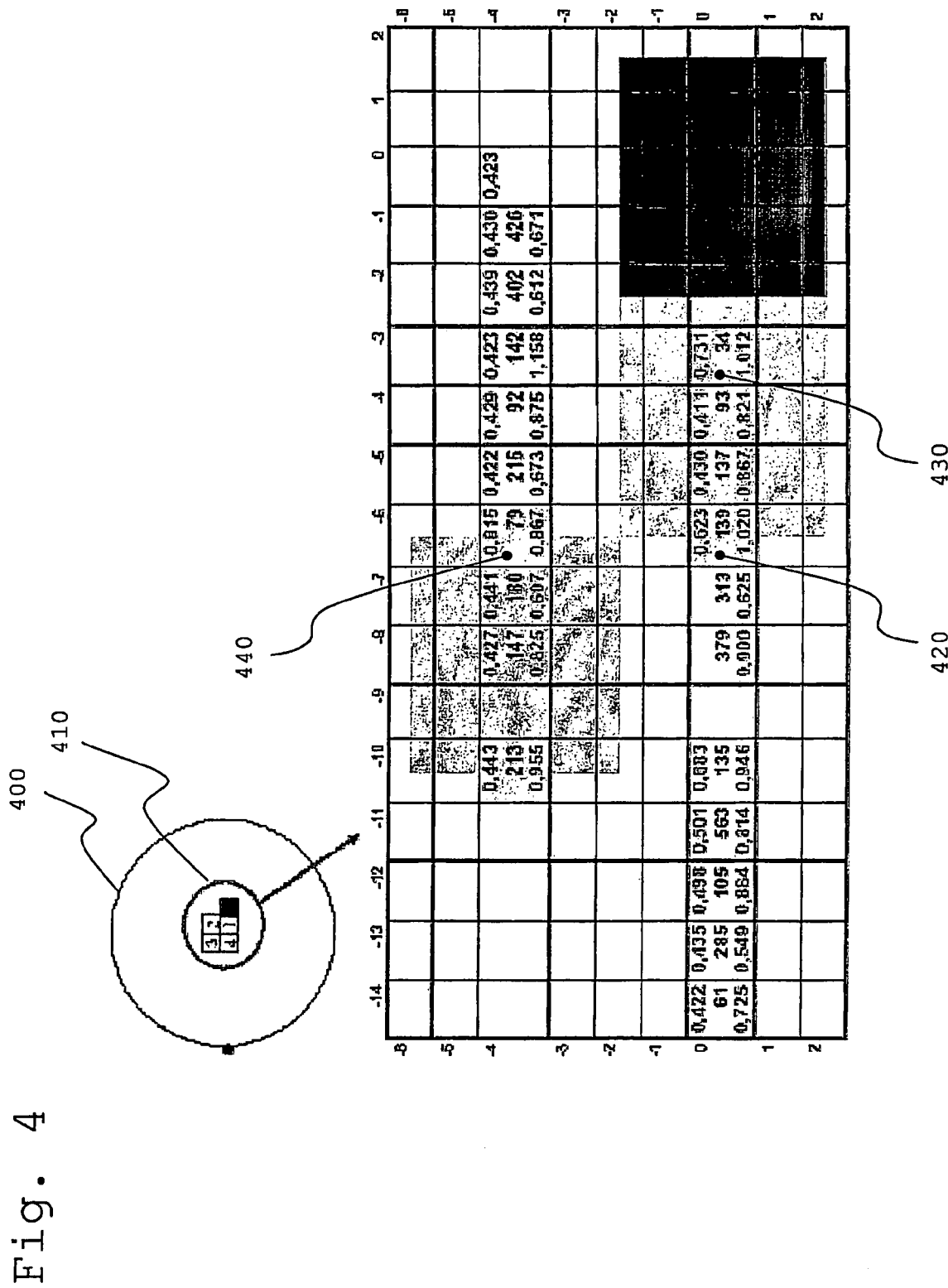

It is shown in:

FIG. 1 an apparatus for performing a CPA method,

FIG. 2 a schematical representation of a diffraction grating,

FIG. 3a a preferred embodiment of the method according to the invention,

FIG. 3b a further preferred embodiment of the method according to the invention, FIG. 4 results of measuring the laser damage threshold of a diffraction grating treated accordingly to the invention.

FIG. 1 schematically shows a high energy laser apparatus for generating a high energy laser pulse based on the CPA method. The pulse of a laser oscillator 210 with an exemplary pulse duration of 100 fs and with energies of a few nanojoules and sufficiently large spectral bandwidth is firstly lengthened in time by an optical delay line. The optical delay line comprises two MLD diffraction gratings 10 in antiparallel arrangement. Guiding the beam is carried out by means of reflectors 230 and 240.

The first grating is imaged inversely behind the second grating by means of appropriate optical systems, such that the individual wavelengths, which the short pulse consists of, cover different distances between the gratings and therefore pass the pulse lengthener in different periods of time.

The time-lengthened pulse is now amplified by several orders of magnitude by means of a power amplifier 220, before the pulse is recompressed with the aid of a pair of gratings consisting of two diffraction gratings 10 in parallel arrangement.

In particular, the diffraction gratings 10 used in the optical compressor are exposed to an especially high laser power. The laser damage threshold of particularly such diffraction gratings is increased by means of the method according to the invention.

FIG. 2 shows a schematical representation of such a diffraction grating 10, which comprises a substrate 140, on which a multi-layer dielectric system 100 is arranged comprising layers 120 and 130 with different refraction indices. A grid is etched into the top layer 110. The grid parameters, exemplarily referred to as a, b and h, can be adapted for maximal efficiency and optimal laser damage threshold. It also lies within the scope of the invention for the form of the grid, especially of the grooves and the ridges, to differ from the shown rectangular form.

The invention proposes to increase the laser damage threshold of such MLD diffraction gratings by irradiating the surface of the grating and of the multi-layer stack with a laser beam. The inventors assume that inter alia residues from the production process of the grating, as well as dust and other destructive and absorbing defects, are removed by laser irradiation. Furthermore, it is assumed that sharp edges with a lower laser damage threshold are also removed.

Advantageously, the wavelength of the treatment laser is chosen in such a manner that a minimal absorption is achieved in the multi-layer system and in the subjacent substrate of the diffraction grating.

FIG. 3a shows a first preferred embodiment of the invention, in which the diffraction grating 10 is irradiated by a treatment laser 300, provided for example as an UV laser.

A further preferred embodiment of the inventive method comprises in a first step irradiating the MDL diffraction grating 10' with the treatment laser 300 before etching the grid, as shown in FIG. 3b, and subsequently etching the top layer of the MLD diffraction grating. Hereby, a further irradiation with the treatment laser may preferably be carried out after the process of etching.

FIG. 4 shows measurement results of the laser damage threshold of a diffraction grating treated according to the invention. Therein, a KrF excimer laser with a wavelength of 248 nm was used at 70% of its UV destruction fluency to increase the laser damage threshold of a diffraction grating with 1740 lines/mm on a fused quartz substrate. It was intended to increase the laser damage threshold of the diffraction grating for a laser pulse with a pulse duration of 500 fs at a wave length of 1054 nm.

The maximum measured laser damage threshold without an inventive laser treatment was approximately 0.4 J/cm$^2$. After a UV laser treatment, the laser damage at 500 fs threshold was measured with a test beam having a diameter of 300 μm. The results for the irradiated areas 1, 2, 3 and 4 inside the region 410 of the diffraction grating 400 are shown in FIG. 4.

The beam of the KrF excimer laser used as treatment laser was homogenized by means of a beam homogenizer and preferably, the irradiation took place at a repeat rate of 50 Hz for approximately one minute.

In FIG. 4 the value in the first line respectively indicates the "non-destructive" fluency on the grating surface in J/cm$^2$, for which after some laser flashes with this fluency a "beam print" is observable on the surface of the grating. The value in the third line respectively indicates the maximal destructive fluency on the grating surface in J/cm$^2$, and the value in the second line respectively indicates the number of laser flashes, from which on a destruction with the corresponding fluency given in the third line occurs.

From FIG. 4 for the irradiated areas 1, 2, 3 and 4 measurement results for the laser damage threshold of about 0.8 J/cm$^2$ (reference sign 440), of about 0.7 J/cm$^2$ (reference sign 430) and of about 0.8 J/cm$^2$ (reference sign 420) can be derived. Therefore, FIG. 4 shows the evident effect of an increase of the laser damage threshold for the method according to the invention. The results of first measurements are shown, which can be further optimized concerning statistical significance and homogeneity.

The invention claimed is:

1. A method for treating a diffraction grating for usage in a high energy laser apparatus having a first laser, comprising the steps of:
   providing the diffraction grating,
   providing a second treatment laser,
   irradiating the diffraction grating with laser light from the second treatment laser until the laser damage threshold of the diffraction grating has increased, wherein the second treatment laser has a wavelength different from the high energy laser apparatus, and
wherein the laser irradiation by means of the second treatment laser is carried out at a repetition rate between 1 and 1000 Hz and for a duration of at least 10 seconds.

2. The method according to claim 1,
   wherein irradiating the diffraction grating comprises a ramp-like increasing of the output power of the second treatment laser beyond the laser damage threshold for the second treatment laser.

3. The method according to claim 2,
   wherein the output power of the second treatment laser is increased ramp-like from below 80% up to at least 120% of the laser damage threshold.

4. The method according to claim 1,
   wherein irradiating with laser light from the second treatment laser is carried out below and close to the laser damage threshold for the second treatment laser.

5. The method according to claim 1,
   wherein the diffraction grating is adapted for use in a high energy laser apparatus, which is adapted for generating laser light in the visible or infrared frequency range.

6. The method according to claim 1,
   wherein the diffraction grating is adapted for use in a high energy laser apparatus with a laser wave length of 1054+/−30%.

7. The method according to claim 1,
   wherein the diffraction grating is adapted for use in a terawatt or petawatt high energy laser apparatus.

8. The method according to claim 1,
   wherein the diffraction grating is adapted for use in a high energy laser apparatus generating ultra-short laser pulses.

9. The method according to claim 1,
   wherein the diffraction grating is adapted for use in a high energy laser apparatus generating laser pulses with a pulse duration below 20 ps.

10. The method according to claim 1,
    wherein the second treatment laser is a UV-laser.

11. The method according to claim 1,
    wherein the laser irradiation by means of the second treatment laser is carried out with an fluency below 90% of the UV damage fluency of the diffraction grating.

12. The method according to claim 1,
    wherein the second treatment laser has a wavelength of 1064 nm, 557 nm, 532 nm, 353 nm, 308 nm, 248 nm, 193 nm or 157 nm.

13. The method according to claim 1,
    wherein the second treatment laser has a wave length below 550 nm.

14. The method according to claim 1,
    wherein irradiating the diffraction grating is carried out in vacuum.

15. The method according to claim 1,
    wherein an excimer laser is used as the second treatment laser.

16. The method according to claim 1,
    wherein the diffraction grating is a multi-layer dielectric (MLD) diffraction grating and
    in a first step a reflector of the diffraction grating is irradiated with the treatment laser before the diffraction grating is etched and
    in a second step a grid of the grating is etched.

17. The method according to claim 16,
    wherein in a third step after etching the grid of the grating the MLD diffraction grating is irradiated by means of the second treatment laser again.

18. The method according to claim 1,
    wherein the diffraction grating is arranged in the optical path of a laser system, which comprises the high energy laser apparatus, wherein the high energy laser apparatus is arranged in such a position that laser pulses generated by it are directable onto the diffraction grating to be reflected in another direction for further use.

* * * * *